United States Patent
Honda et al.

(10) Patent No.: US 12,536,139 B2
(45) Date of Patent: Jan. 27, 2026

(54) ANOMALY DETECTION FOR COMPUTING SYSTEMS

(71) Applicant: Rubrik, Inc., Palo Alto, CA (US)

(72) Inventors: Junya Honda, Mountain View, CA (US); Anuj Dhawan, Mountain View, CA (US); Muraliraja Muniraju, Fremont, CA (US)

(73) Assignee: Rubrik, Inc., Palo Alto, CA (US)

( * ) Notice: Subject to any disclaimer, the term of this patent is extended or adjusted under 35 U.S.C. 154(b) by 61 days.

(21) Appl. No.: 18/431,501

(22) Filed: Feb. 2, 2024

(65) Prior Publication Data

US 2025/0252082 A1   Aug. 7, 2025

(51) Int. Cl.
| | |
|---|---|
| G06F 16/17 | (2019.01) |
| G06F 16/11 | (2019.01) |
| G06F 16/16 | (2019.01) |
| G06F 16/176 | (2019.01) |
| G06F 16/18 | (2019.01) |

(52) U.S. Cl.
CPC ........ *G06F 16/1734* (2019.01); *G06F 16/128* (2019.01); *G06F 16/162* (2019.01); *G06F 16/176* (2019.01); *G06F 16/1873* (2019.01)

(58) Field of Classification Search
CPC .. G06F 16/1734; G06F 16/125; G06F 16/128; G06F 16/16

USPC .......................................................... 707/690
See application file for complete search history.

(56) References Cited

U.S. PATENT DOCUMENTS

| | | | |
|---|---|---|---|
| 12,210,423 B1 * | 1/2025 | Karuppur Rajagopalan ............... | G06F 11/1451 |
| 2020/0233837 A1 * | 7/2020 | Morton .................. | G06F 16/128 |
| 2024/0134821 A1 * | 4/2024 | Rogers .................. | G06F 16/125 |
| 2024/0143454 A1 * | 5/2024 | Katuri .................... | G06F 3/0619 |
| 2024/0202162 A1 * | 6/2024 | Elango ................. | G06F 11/1448 |
| 2024/0411646 A1 * | 12/2024 | Singh ................... | G06F 11/1451 |

* cited by examiner

*Primary Examiner* — Shahid A Alam
(74) *Attorney, Agent, or Firm* — Holland & Hart LLP

(57) ABSTRACT

Methods, systems, and devices for data management are described. A data system may capture a first snapshot of a target computing system at a first time, and a second snapshot at a second time that is later than the first time. The system may compare the second snapshot with the first snapshot to identify whether a set of deleted files includes a quantity of deleted files that satisfies a file deletion threshold. Using metadata associated with the target computing system, the system may identify a subset of the set of deleted files as corresponding to one or more system files. The DMS may then determine whether a ratio between a first value of a deletion metric and a second value of the deletion metric satisfies a threshold ratio. In some examples, the system may refrain from generating an alert based on the ratios satisfying the threshold ratio.

20 Claims, 10 Drawing Sheets

ANOMALY DETECTION FOR COMPUTING SYSTEMS

FIELD OF TECHNOLOGY

The present disclosure relates generally to data management, including techniques for improved anomaly detection for computing systems.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

DETAILED DESCRIPTION

Figure 1:
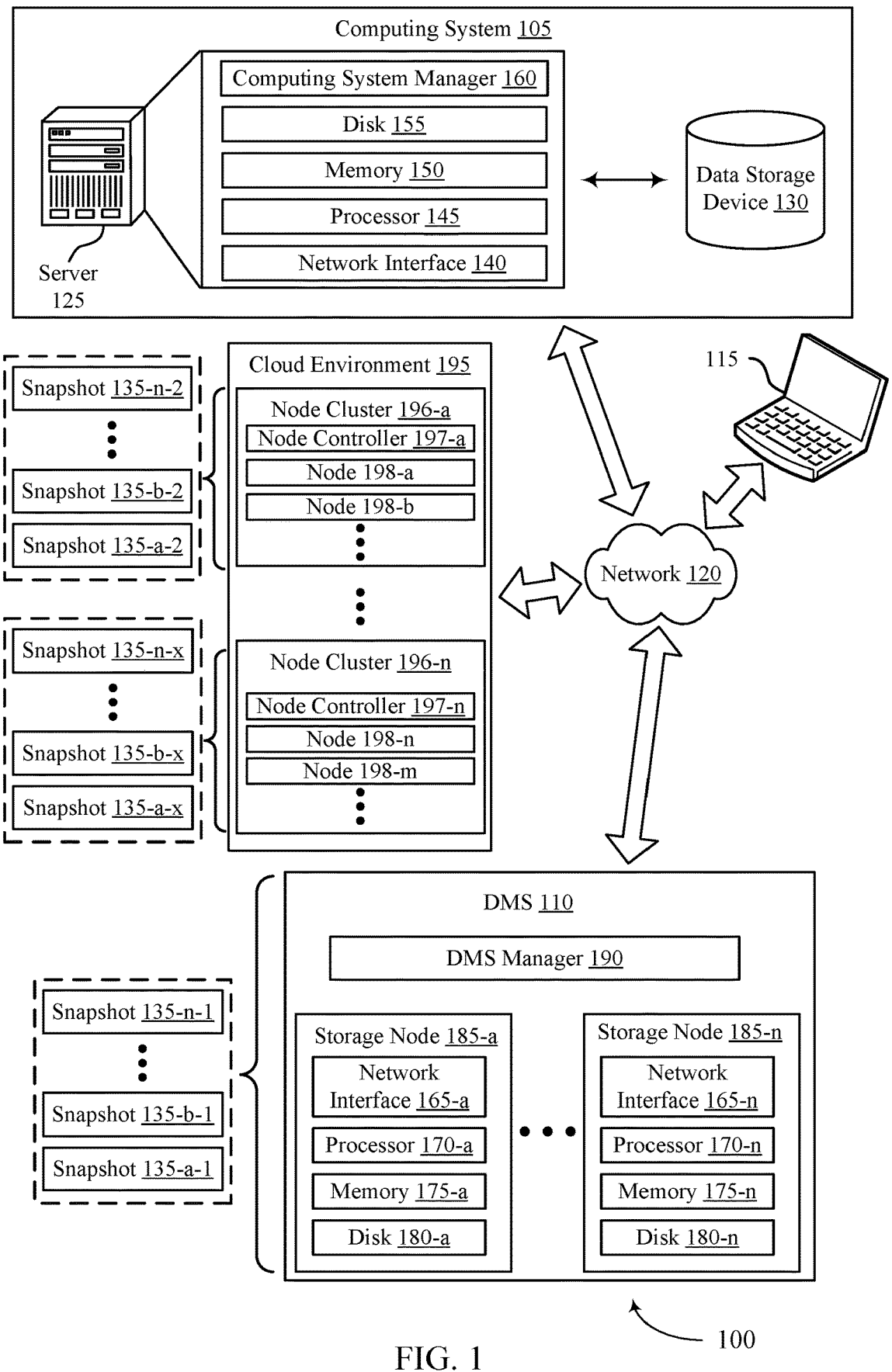
FIG. 1 illustrates an example of a computing environment that supports improved anomaly detection for computing systems in accordance with aspects of the present disclosure.

A data management system (DMS) may support performing data backup for a target computing system. The DMS may capture periodic snapshots of the target computing system and maintain metadata corresponding to changes performed in the target computing system. Malicious activities, such as ransomware attacks, may result in large-scale change (e.g., mass deletion of content) at a computing system. A DMS may identify anomalous activity by observing differences between a more recent snapshot of a target computing system and a previously captured snapshot of the target computing system, such as the quantity of files that were deleted from the target computing system in between the two snapshots being captured. However, non-malicious activities like system upgrades, temporary file cleanups, application upgrades may also result in a large degree of change between two snapshots, which may incorrectly be inferred as resulting from anomalous (e.g., malicious) activity. This may lead to false positives (e.g., incorrect alerts by an anomaly detection service provided by the DMS), which may have a negative impact on user experience.

One or more aspects of the present disclosure provide improved solutions for identifying, by a DMS, anomalous (e.g., malicious) activity at a target computing system. A DMS may perform a backup of a target computing system. As part of the backup process, the DMS may periodically capture snapshots of the target computing system. In addition, the DMS may maintain file system metadata corresponding to the data in the target computing system. Upon capturing a new snapshot, according to the present invention, the DMS may identify a degree of change between the current snapshot and a previous snapshot. If the degree of change satisfies a threshold (e.g., if the filesystem snapshot has a large/abnormal churn), then the DMS may proceed to check whether the cause is malicious (e.g., malware) or non-malicious (e.g., a system upgrade, temporary file cleanup, or application upgrade). For instance, for each file that was deleted during the time between the two snapshots, the DMS may determine whether a filepath of the deleted file indicates that the deleted file corresponds to (e.g., is or is associated with) a system file. The DMS may then compute a ratio between the quantity of deleted system files and the total quantity of deleted files, which may be referred to as a system-file-count ratio. The DMS may compare the computed system-file-count ratio to a corresponding system-file-count threshold. Additionally, or alternatively, the DMS may compute a ratio between the quantity of deleted bytes corresponding to the deleted system files and the total quantity of deleted bytes corresponding to all the deleted files, which may be referred to as a system-file-byte ratio, and compare the computed system-file-byte ratio to a corresponding system-file-byte threshold. If either of the ratios is greater than or equal to the corresponding threshold, then the DMS may determine that this anomaly in the captured snapshot was non-malicious, and may mark the snapshot as non-anomalous, therefore not alerting the customers.

FIG. 1 illustrates an example of a computing environment 100 that supports improved anomaly detection for computing systems in accordance with aspects of the present disclosure. The computing environment 100 may include a computing system 105, a DMS 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory (ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below.

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g., a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot 135 to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots 135, including for the same computing object.

For example, the DMS 110 may store both base snapshots 135 and incremental snapshots 135. A base snapshot 135 may represent the entirety of the state of the corresponding computing object as of a point in time corresponding to the base snapshot 135. An incremental snapshot 135 may represent the changes to the state—which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a full snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a full snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally or alternatively, the DMS 110 may detect whether aspects of the computing system 105 have been impacted by malware (e.g., ransomware). Additionally or alternatively, the DMS 110 may relocate data or create copies of data based on using one or more snapshots 135 to restore the associated computing object within its original location or at a new location (e.g., a new location within a different computing system 105). Additionally or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely affecting (e.g., infecting, loading, etc.) the computing system 105.

In some examples, the DMS 110, and in particular the DMS manager 190, may be referred to as a control plane. The control plane may manage tasks, such as storing data management data or performing restorations, among other possible examples. The control plane may be common to multiple customers or tenants of the DMS 110. For example, the computing system 105 may be associated with a first customer or tenant of the DMS 110, and the DMS 110 may similarly provide data management services for one or more other computing systems associated with one or more additional customers or tenants. In some examples, the control plane may be configured to manage the transfer of data management data (e.g., snapshots 135 associated with the computing system 105) to a cloud environment 195 (e.g., Microsoft Azure or Amazon Web Services). In addition, or as an alternative, to being configured to manage the transfer of data management data to the cloud environment 195, the control plane may be configured to transfer metadata for the data management data to the cloud environment 195. The metadata may be configured to facilitate storage of the stored data management data, the management of the stored management data, the processing of the stored management data, the restoration of the stored data management data, and the like.

Each customer or tenant of the DMS 110 may have a private data plane, where a data plane may include a location at which customer or tenant data is stored. For example, each private data plane for each customer or tenant may include a node cluster 196 across which data (e.g., data management data, metadata for data management data, etc.) for a customer or tenant is stored. Each node cluster 196 may include a node controller 197 which manages the nodes 198 of the node cluster 196. As an example, a node cluster 196 for one tenant or customer may be hosted on Microsoft Azure, and another node cluster 196 may be hosted on Amazon Web Services. In another example, multiple separate node clusters 196 for multiple different customers or tenants may be hosted on Microsoft Azure. Separating each customer or tenant's data into separate node clusters 196 provides fault isolation for the different customers or tenants and provides security by limiting access to data for each customer or tenant.

The control plane (e.g., the DMS 110, and specifically the DMS manager 190) manages tasks, such as storing backups or snapshots 135 or performing restorations, across the multiple node clusters 196. For example, as described herein, a node cluster 196-a may be associated with the first customer or tenant associated with the computing system 105. The DMS 110 may obtain (e.g., generate or receive) and transfer the snapshots 135 associated with the computing system 105 to the node cluster 196-a in accordance with a service level agreement for the first customer or tenant associated with the computing system 105. For example, a service level agreement may define backup and recovery parameters for a customer or tenant such as snapshot generation frequency, which computing objects to backup, where to store the snapshots 135 (e.g., which private data plane), and how long to retain snapshots 135. As described herein, the control plane may provide data management services for another computing system associated with another customer or tenant. For example, the control plane may generate and transfer snapshots 135 for another computing system associated with another customer or tenant to the node cluster 196-n in accordance with the service level agreement for the other customer or tenant.

To manage tasks, such as storing backups or snapshots 135 or performing restorations, across the multiple node clusters 196, the control plane (e.g., the DMS manager 190) may communicate with the node controllers 197 for the various node clusters via the network 120. For example, the control plane may exchange communications for backup and recovery tasks with the node controllers 197 in the form of transmission control protocol (TCP) packets via the network 120.

A DMS 110 may capture a first snapshot of a target computing system at a first time and may then capture a second snapshot of the target computing system at a second time that is later than the first time. The DMS 110 may then compare the second snapshot with the first snapshot to identify whether a set of files, for the target computing system, deleted between the first time and the second time includes a quantity of deleted files that satisfies a file deletion threshold. The DMS 110 may use metadata associated with the target computing system to identify, based on the quantity of deleted files satisfying the file deletion threshold, a subset of the set of deleted files as corresponding to one or more system files. The DMS 110 may then determine whether a ratio between a first value of a deletion metric for the subset of the set of deleted files and a second value of the deletion metric for the set of deleted files satisfies a threshold ratio. In such cases, the DMS 110 may refrain from generating an alert, despite the quantity of deleted files satisfying the file deletion threshold, based on the ratio between the first value of the deletion metric and the second value of the deletion metric satisfying the threshold ratio.

Figure 2:
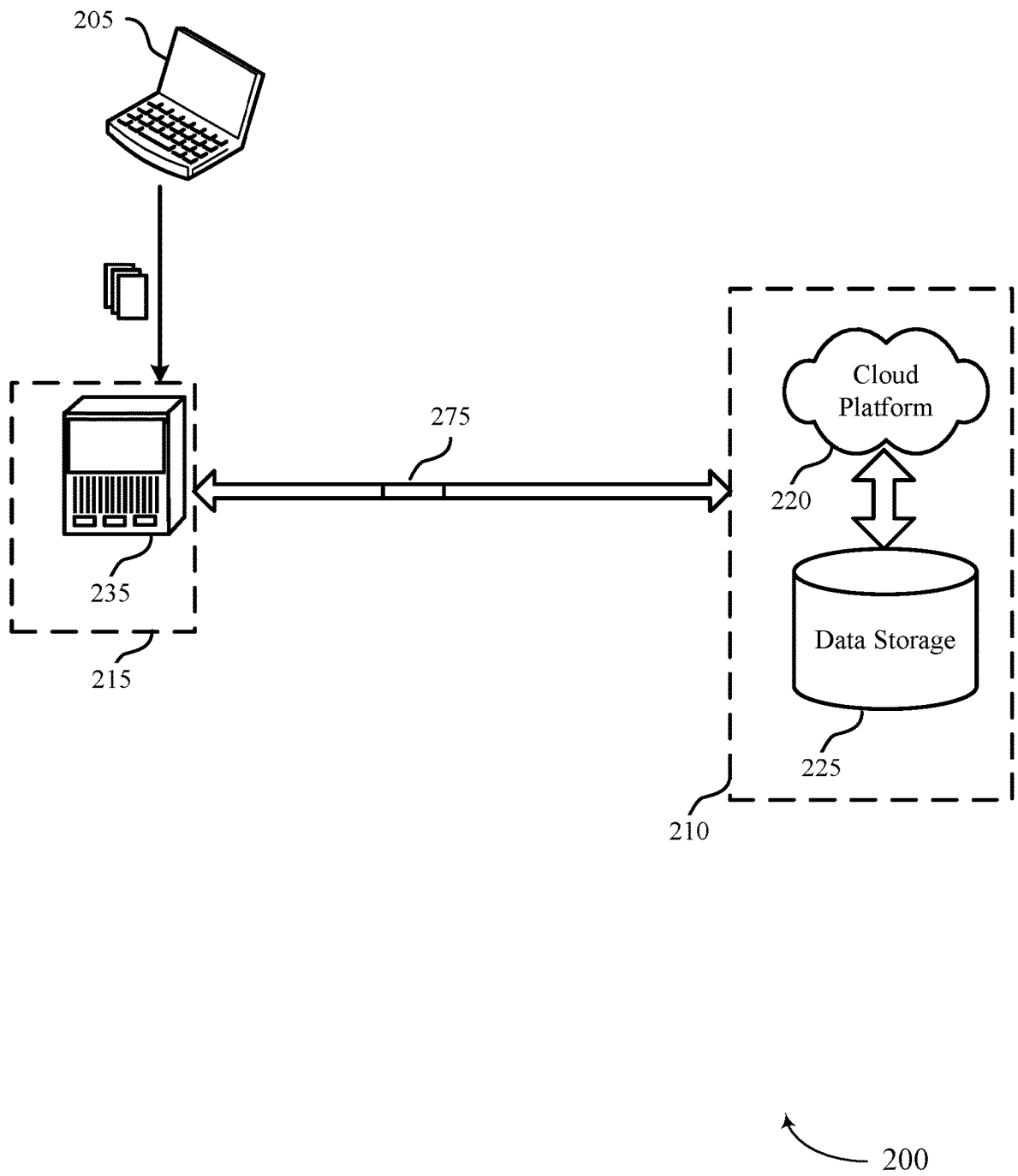
FIG. 2 shows an example of a computing system that supports improved anomaly detection for computing systems in accordance with aspects of the present disclosure.

FIG. 2 shows an example of a computing system 200 that supports improved anomaly detection for computing systems in accordance with aspects of the present disclosure. The computing system 200 includes a user device 205, a DMS 210 and a data manager 215. The DMS 210 may be or include a data storage infrastructure. The user device 205 may be an example of a device described with reference to FIG. 1. The user device 205 may also be an example of a cloud client. A cloud client may access data sources using a network connection. The network may implement transfer control protocol and internet protocol (TCP/IP), such as the Internet, or may implement other network protocols. The user device 205 may be an example of a user device, such as a server, a smartphone, or a laptop. In other examples, a user device 205 may be a desktop computer, a tablet, a sensor, or another computing device or system capable of generating, analyzing, transmitting, or receiving communications. In some examples, the user device 205 may be operated by a user that is part of a business, an enterprise, a non-profit, a startup, or any other organization type.

The DMS 210 may include a data storage 225 (e.g., a storage node or a distributed storage node). Although not depicted herein, the DMS 210 may include more than one data storage 225. Multiple data storages 225 (e.g., storage nodes of a distributed storage architecture) may be geographically separated from each other. As depicted in the example of FIG. 2, the DMS 210 may include a cloud platform 220. The cloud platform 220 may offer an on-demand storage and computing services to the user device 205. In some cases, the DMS 210 may be an example of a storage system with built-in data management. The DMS 210 may serve multiple users with a single instance of software. However, other types of systems may be implemented, including—but not limited to—client-server systems, mobile device systems, and mobile network systems. The data manager 215 may be an example of an integrated data management and storage system. The data manager 215 may include an application server 235. The application server 235 may represent a unified storage system even though numerous storage nodes may be connected together and the number of connected storage nodes may change over time as storage nodes are added or removed. The data manager 215 may also be an example of a cloud-based storage and an on-demand computing platform.

As depicted herein, the computing system 200 may support an integrated data management and storage system and may be configured to manage the automated storage, backup, deduplication, replication, recovery, and archival of data within and across physical and virtual computing environments. The computing system 200 including an integrated data management and storage system may provide a unified primary and secondary storage system with built-in data management that may be used as both a backup storage system and a "live" primary storage system for primary workloads. In some cases, the integrated data management and storage system may manage dynamic versions when performing data storage. In some examples, the computing system 200 may provide backup of data (e.g., one or more files) using parallelized workloads, where the data may reside on virtual machines and/or real machines (e.g., a hardware server, a laptop, a tablet computer, a smartphone, or a mobile computing device).

According to aspects depicted herein, the computing system 200 may support a large number of databases running on clustered setups. In some examples, such databases may have instances running across multiple nodes of a cluster (e.g., DMS 210 including a computing cluster). The computing system 200 may face challenges related identifying malicious activity on a computing device when performing scheduled backup. Aspects depicted herein provide for improved anomaly detection for computing systems in one or more databases.

Computing system 200 may support detection of ransomware attacks and malicious mass deletions and alerting the customers on them. In some examples, a computing system may determine an overall churn (change in items) statistics between two snapshots in order to identify anomalous activity. However, activities like system upgrades, temporary file cleanups, and application upgrades are also large-sized churn operations which may erroneously get inferred as anomalous. To improve anomaly detection, the techniques depicted herein provides for a solution to help differentiate common non-malicious operations on file systems from malicious activities like mass encryption and wiper events. This helps reduce false alerts sent to the customers, thereby improving the detection quality.

Aspects depicted herein provide an approach to identify common system upgrades and temporary file cleanups in backup data. The techniques implements by computing system 200 relies on matching patterns on the filepaths in the snapshot which includes the majority of the churn in that snapshot. In some examples, the computing system 200 may analyze patterns in file system metadata for large churn operations and create a static list of filepaths and directory names. In particular, the computing system 200 may identify prefixes of paths with maximum churn. In some cases, such identification may be limited to k-depth in terms of the number of directories in the path.

According to one or more aspects depicted herein, the data manager 215 may receive one or more files from the user device 205. The data manager 215 may store the files in the data storage 225 via cloud platform 220, and may regularly capture snapshots. In some examples, the data manager 215 may compare two subsequent snapshots to identify a number of deleted files. The data manager 215 may identify the names of directories with maximum churn (e.g., the names of the directories associated with the deleted files). For example, the data manager 215 may capture a first snapshot of a target computing system at a first time and may capture a second snapshot of the target computing system at a second time that is later than the first time. The data manager 215 may then compare the second snapshot with the first snapshot to identify whether a set of files, for the target computing system, deleted between the first time and the second time includes a quantity of deleted files that satisfies a file deletion threshold. If the quantity of deleted files satisfies the file deletion threshold, the data manager 215 may use metadata associated with the target computing system to identify a subset of the set of deleted files as corresponding to one or more system files. For example, the data manager 215 may use one or more filepaths and/or directory information to identify the system files. In some examples, the data manager 215 may have access to common knowledge (in form of metadata), and the data manager 215 may use common knowledge to identify one or more directories and paths commonly used in operating system upgrades, application upgrades, and temporary files to refine a list of approved file deletions and may determine a final list. For an input backup, for each file in the snapshot (differential), if its path matches the directory name patterns in the list, then the data manager 215 may infer that file a system file for the modeling purpose.

In some examples, the data manager 215 may determine whether a ratio between a first value of a deletion metric for the subset of the set of deleted files and a second value of the deletion metric for the set of deleted files satisfies a threshold ratio. In some instances, the first value of the deletion metric may include a quantity of files identified as corresponding to one or more system files, where the second value of the deletion metric includes the quantity of deleted files, and where the threshold ratio is a system file count ratio threshold. In such cases, for each file that is identified from among the set of deleted files as corresponding to a system file, the data manager 215 may increment a counter, where a value of the counter indicates (e.g., is equal to) the quantity of files identified as corresponding to one or more system files.

Additionally, or alternatively, the data manager 215 may determine a first collective byte size corresponding to the subset of the set of deleted files identified as corresponding to one or more system files. The data manager 215 may further determine a second collective byte size corresponding to the set of deleted files, where the first value of the deletion metric includes the first collective byte size and the second value of the deletion metric includes the second collective byte size, and where the threshold ratio is a system file bytes count ratio threshold. Thus, the data manager 215 may use the system file count ratio threshold or the system file bytes count ratio threshold or both to determine whether the quantity of deleted files represent a malicious attack. That is, for a newly captured snapshot, the data manager 215 may compute the ratio of system files (and bytes) that were deleted to the total files (and bytes). If the ratio exceeds a threshold, then the data manager 215 may determine that the changes in the snapshot are due to a system (operating system or application) upgrade. As depicted herein, the data manger 215 may use researched or experimented ratio of files (that are either system files or temporary files) to determine whether an anomalous filesystem snapshot is malicious or not. If the ratio between the first value of the deletion metric and the second value of the deletion metric satisfies the threshold ratio, then the data manager 215 may refrain from generating an alert. Alternatively, if the ratio between the first value of the deletion metric and the second value of the deletion metric does not satisfy the threshold ratio, then the data manager 215 may generate an alert, where the alert indicates a malicious activity on the target computing system.

In some examples, the data manager 215 may use researched or experimented list of system file directories to determine whether or not a file within a filesystem snapshot is a system upgrade file or not. Additionally, or alternatively, the data manager 215 may use researched or experimented list of temporary file directories to determine whether or a file within a filesystem snapshot is a temporary file. In such cases, the data manager 215 may not only extract the numerical change within a filesystem snapshot, but also to extract the context of these changes in a given snapshot, which allows the computing system 200 to improve determining whether a filesystem change is a malicious.

In some cases, the data manager 215 may calibrate a system file ratio threshold to classify system upgrades using the history of the current snapshot or the global history or both. Additionally, by having two system file thresholds (system file count ratio threshold and system file bytes count ratio threshold), the computing system 200 may be able to calibrate one or the other independently, thereby having a better learning opportunity along with better customizability to improve its own system upgrade classification capabilities. Therefore, with the approach depicted herein, the anomaly detection may become aware of what type of files were deleted instead of just looking at overall numbers of files or bytes deleted. This gives anomaly detection ability of the computing system 200 to infer the kind of mass deletion the snapshot was.

Figure 3:
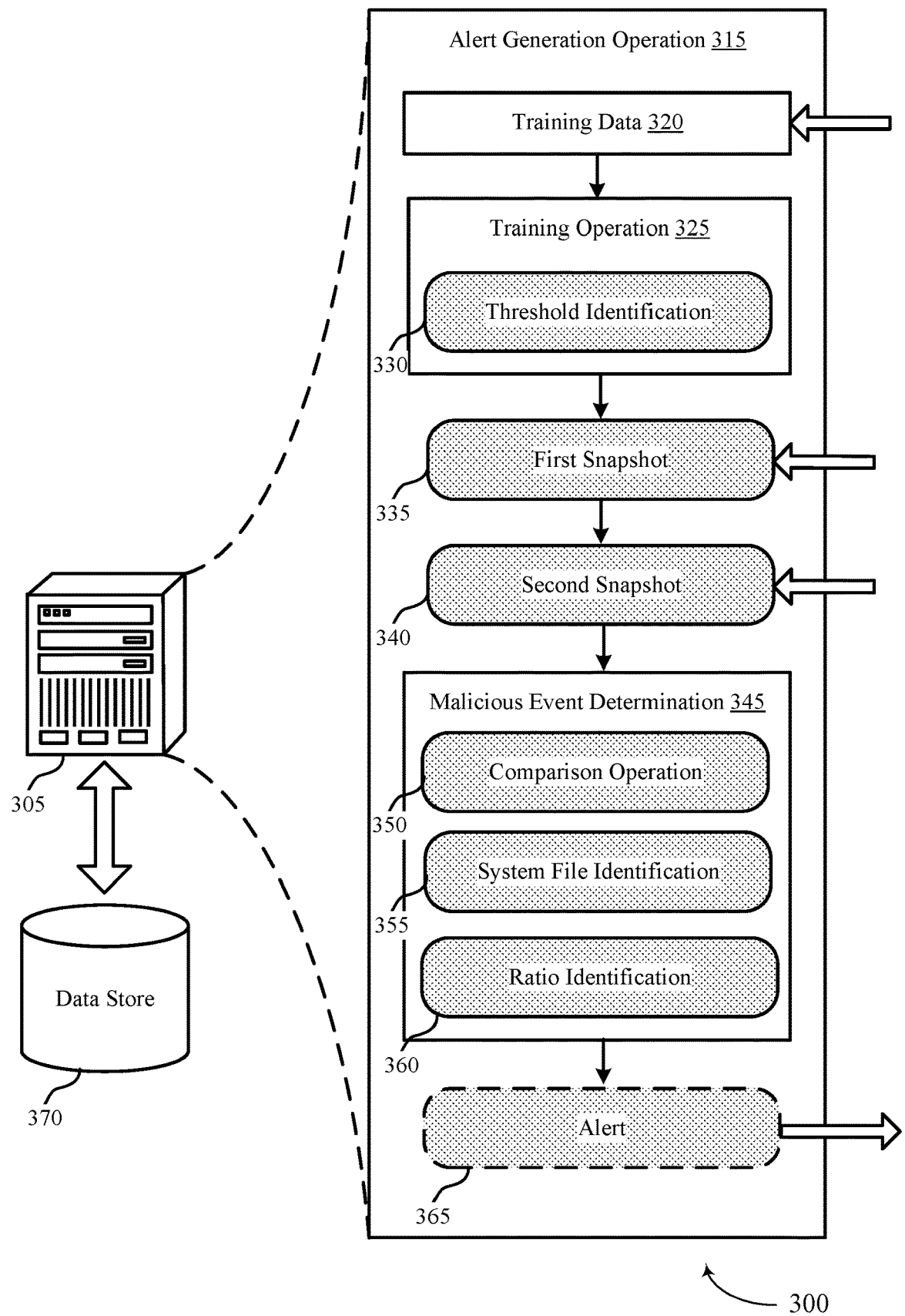
FIG. 3 shows an example of a computing system that supports improved anomaly detection for computing systems in accordance with aspects of the present disclosure.

FIG. 3 shows an example of a computing system 300 that supports improved anomaly detection for computing systems in accordance with aspects of the present disclosure. The computing system 300 may include a device 305 (e.g., an application server or server system) and a data store 370. In some cases, the functions performed by the device 305 (such as application server) may instead be performed by a component of the data store 370. A user device (not shown) may support an application for data management. Specifically, a user device in combination with the device 305 may support improved anomaly detection for computing systems. An application (or an application hosting the DMS) may train a mathematical model (e.g., artificial intelligence model) at the device 305, where the device 305 may identify malicious event based on training data and using the trained data to generate an alert 365. In some examples, the device 305 may provide the alert 365 to a user device (not shown).

According to one or more aspects of the present disclosure, a user device may provide or be associated with a source data storage. In some cases, the device 305 may train or develop a mathematical model (e.g., artificial intelligence model, a machine learning model, a neural network model etc.) to determining malicious activity when backing up data from a user device. In certain aspects, the device 305 (or application server) may receive a request to develop an artificial intelligence model to improve anomaly detection. Additionally, or alternatively, the device 305 may develop an artificial intelligence model (e.g., machine learning model) for classifying anomalous file deletion activities and generate an alert. As described herein, the device 305 in conjunction with the data store 370 may perform an alert generation operation 315.

According to one or more aspects of the present disclosure, the alert generation operation 315 may be performed by the device 305, such as a server (e.g., an application server, a database server, a server cluster, a virtual machine, a container, etc.). Although not shown in FIG. 3, the alert generation operation 315 may be performed by a user device, a data store, or some combination of these or similar devices. In some cases, the device 305 may be a component of a DMS 110 as described with reference to FIG. 1. The device 305 may support computer aided data science, which may be performed by an artificial intelligence-enhanced data analytics framework. The device 305 may be an example of a general analysis machine and, as such, may perform data analytics and provide improved anomaly detection for computing systems.

According to one or more aspects of the present disclosure, the device 305 may receive training data 320 from one or more prior backup activities. The training data may include metadata associated with one or more snapshots, file deletion activity, system file information, etc. The device 305 may perform a training operation 325 using the received training data 320. As part of the training operation 325, the device may perform a threshold identification 330. In the threshold identification 330, the device 305 may determine a threshold ratio based on quantities of deleted files or deleted bytes associated with snapshots of a target computing system that were captured prior to a first time (e.g., historical data included in the training data 320). Once the training operation 325 is complete, the device 305 may use the threshold ratios to identify anomaly between two snapshots.

The device 305 may capture or otherwise receive a first snapshot 335 of a target computing system at the first time. The device 305 may capture or otherwise receive a second snapshot of the target computing system at a second time that is later than the first time. The device 305, upon capturing or otherwise identifying the two snapshots, may perform a malicious event determination step 345.

In the malicious event determination step 345, the device 305 may perform a comparison operation 350. In the comparison operation 350, the device 305 may compare the second snapshot with the first snapshot to identify whether a set of files, for the target computing system, deleted between the first time and the second time includes a quantity of deleted files that satisfies a file deletion threshold. For example, the device 305 compares the two snapshots to identify a number of files that have been deleted after the first snapshot was captured.

The device 305 may perform a system file identification 355 after performing the comparison operation 350. In particular, the device 305 may use metadata associated with the target computing system to identify, based on the quantity of deleted files satisfying the file deletion threshold, a subset of the set of deleted files as corresponding to one or more system files. While reviewing the difference between the current snapshot and the previous snapshot (differential file metadata (diff FMDs), instead of just extracting the total number files and bytes changed, the device 305 may inspect the filepath of the file. When looking at the filepath of the file, the device 305 may determine whether the filepath indicates that the current file metadata (FMD) is for a system file (or temporary file, in some cases). If the file is determined to be a system or temporary file and the file was deleted, the device 305 may increment the system file deleted count by 1, and increase the system file bytes deleted count by the size of the deleted file. Additionally, or alternatively, if the filesystem snapshot has a large/abnormal churn (e.g., if the device 305 determines that a large number of system files were deleted between the first snapshot and the second snapshot), then the device 305 may proceed to check whether or this anomalous filesystem snapshot is malicious or is a system upgrade, which is not malicious.

In order to determine whether the anomalous snapshot is a system upgrade, the device 305 may determine the kind of deletion anomaly associated with the snapshot. To identify the deletion anomaly, the device 305 may perform a ratio identification operation 360. In particular, the device 305 may determine whether a ratio between a first value of a deletion metric for the subset of the set of deleted files and a second value of the deletion metric for the set of deleted files satisfies a threshold ratio (e.g., ratio determined in the threshold identification 330). In case of mass file deletion anomaly, the device 305 may compare the system file deleted ratio ((system file deleted+temporary file deleted)/total files deleted) and compare it with the system file threshold. For example, the first value of the deletion metric may include a quantity of files identified as corresponding to one or more system files, the second value of the deletion metric may include the quantity of deleted files, and the threshold ratio may include a system file count ratio threshold.

For mass bytes deletion anomaly, the device 305 may compare the calculated system bytes deleted ratio with its respective system bytes threshold. In such cases, the device 305 may determine a first collective byte size corresponding to the subset of the set of deleted files identified as corresponding to one or more system files. The device 305 may further determine a second collective byte size corresponding to the set of deleted files. In such cases, the first value of the deletion metric may include the first collective byte size and the second value of the deletion metric may include the second collective byte size, and the threshold ratio may include a system file bytes count ratio threshold. If the system ratio is greater than or equal to the threshold, then the device 305 may determine that this anomalous mass deletion snapshot was non-malicious, and mark the snapshot as non-anomalous, therefore not alerting the customers. In such cases, the device 305 may refrain from generating an alert, despite the quantity of deleted files satisfying the file deletion threshold, based on the ratio between the first value of the deletion metric and the second value of the deletion metric satisfying the threshold ratio. Alternatively, if the ratio between the first value of the deletion metric and the second value of the deletion metric does not satisfy the threshold ratio, the device 305 may generate an alert 365. The alert 365 may indicate a malicious activity on the target computing system.

Figure 4:
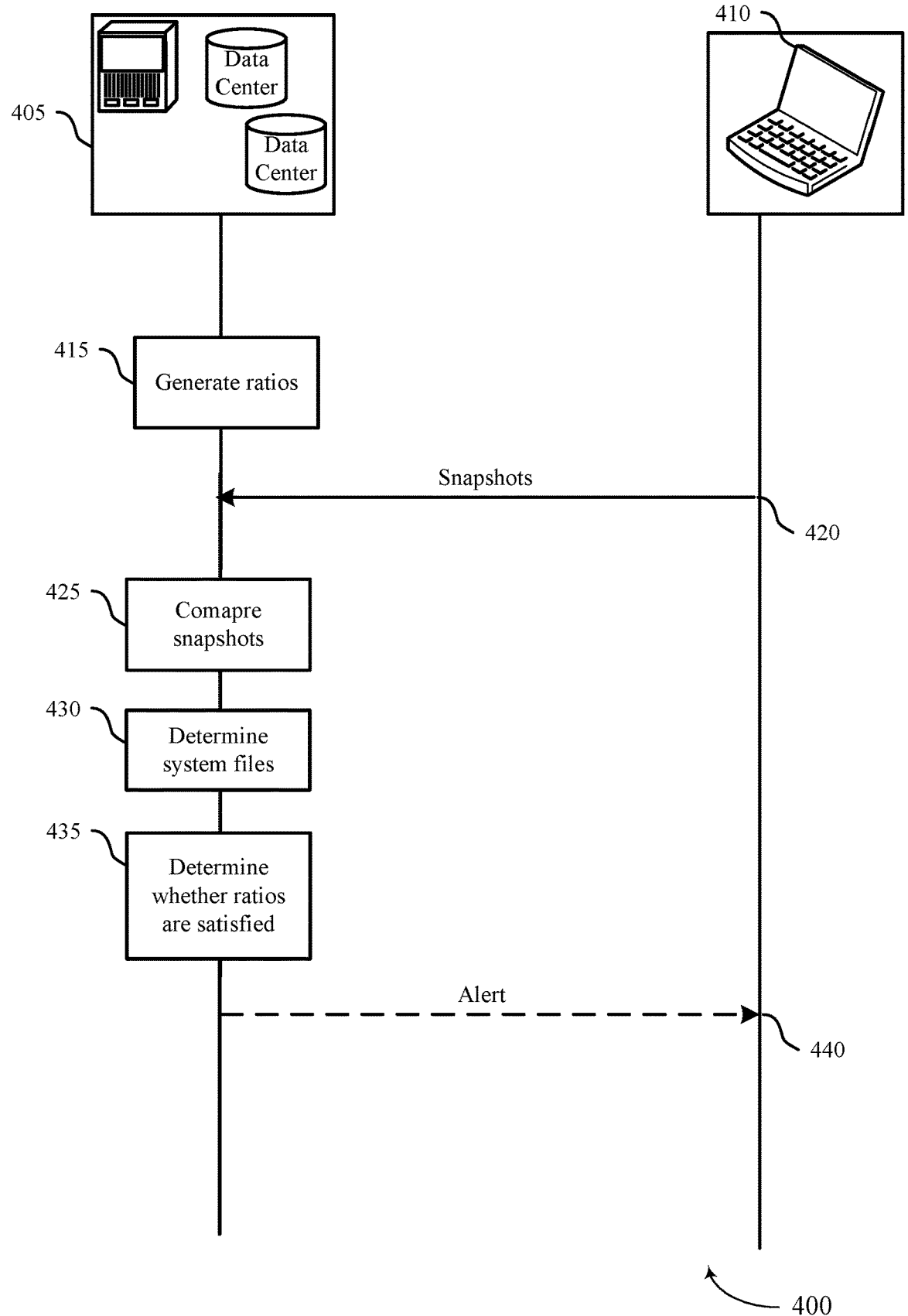
FIG. 4 shows an example of a process flow that supports improved anomaly detection for computing systems in accordance with aspects of the present disclosure.

FIG. 4 shows an example of a process flow 400 that supports improved anomaly detection for computing systems in accordance with aspects of the present disclosure. The process flow 400 includes a DMS 405 and a user device 410. The DMS 405 may include an application server, one or more data storages (e.g., multiple data centers of a computing cluster) as described with respect to FIGS. 2 and 3. The user device 410 may be an example of a user device as described with respect to FIGS. 2 and 3. Although a single entity is depicted as DMS 405, it may be understood that components of the DMS 405 may be located in different locations.

In some examples, the operations illustrated in the process flow 400 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 415, the DMS 405 may generate one or more threshold ratios for identifying anomalous snapshots. At 420, the DMS 405 may capture or otherwise receive a first snapshot of a target computing system at a first time, and a second snapshot of the target computing system at a second time that is later than the first time.

At 425, the DMS 405 may compare the second snapshot with the first snapshot to identify whether a set of files, for the target computing system, deleted between the first time and the second time includes a quantity of deleted files that satisfies a file deletion threshold.

At 430, the DMS 405, using metadata associated with the target computing system, may identify, based on the quantity of deleted files satisfying the file deletion threshold, a subset of the set of deleted files as corresponding to one or more system files.

At 435, the DMS 405 may determine whether a ratio between a first value of a deletion metric for the subset of the set of deleted files and a second value of the deletion metric for the set of deleted files satisfies a threshold ratio. In some examples, the first value of the deletion metric may include a quantity of files identified as corresponding to one or more system files, the second value of the deletion metric may include the quantity of deleted files, and the threshold ratio may include a system file count ratio threshold. In some examples, the DMS 405 may determine a first collective byte size corresponding to the subset of the set of deleted files identified as corresponding to one or more system files. The DMS 405 may then determine a second collective byte size corresponding to the set of deleted files. In such cases, the first value of the deletion metric may include the first collective byte size the second value of the deletion metric may include the second collective byte size, and the threshold ratio may include a system file bytes count ratio threshold.

At 440, the DMS 405 may optionally generate an alert based on the ratio between the first value of the deletion metric and the second value of the deletion metric not satisfying the threshold ratio. Alternatively, the DMS 405 may refrain from generating an alert, despite the quantity of deleted files satisfying the file deletion threshold, based on the ratio between the first value of the deletion metric and the second value of the deletion metric satisfying the threshold ratio.

Figure 5:
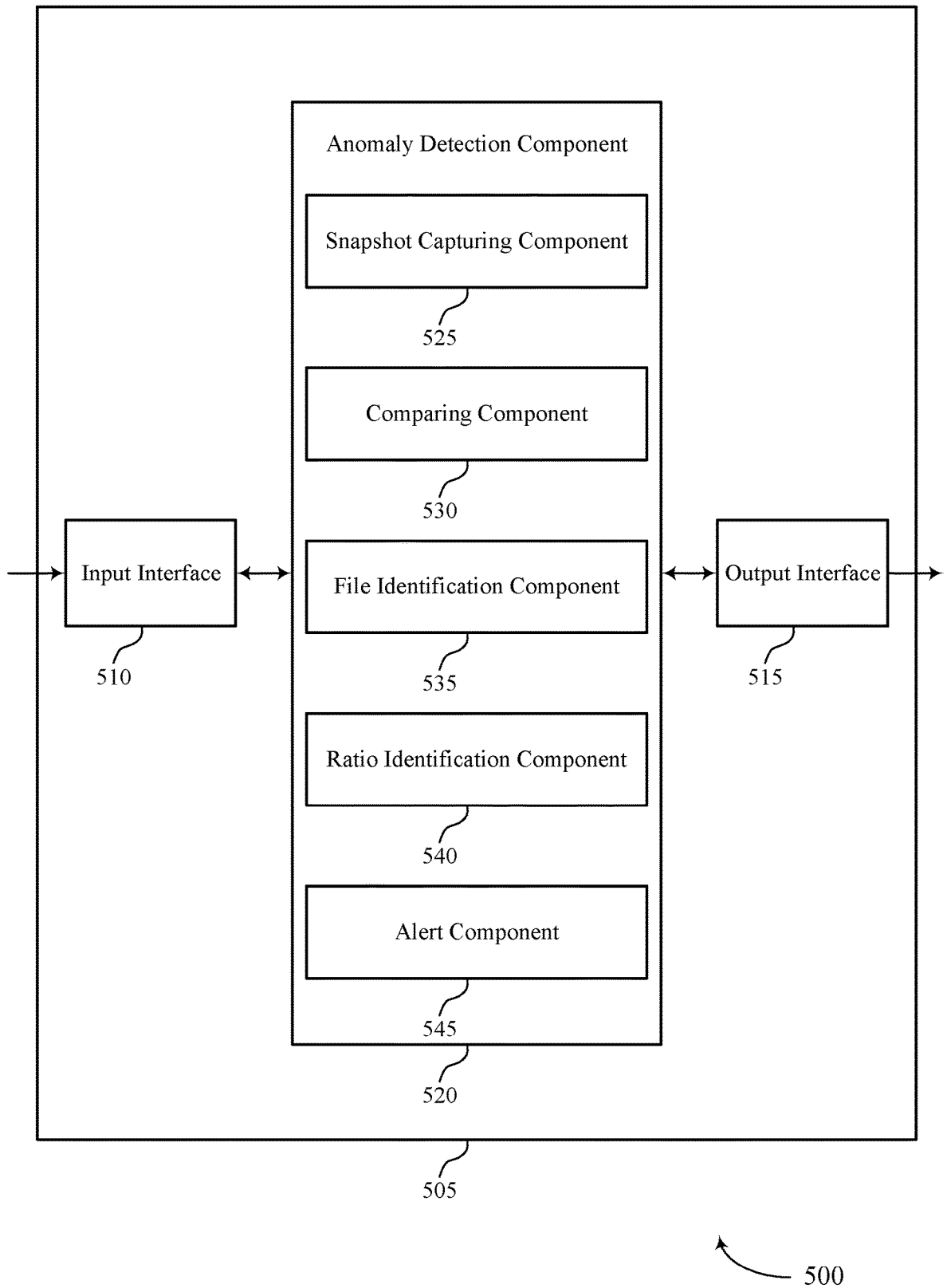
FIG. 5 shows a block diagram of an apparatus that supports improved anomaly detection for computing systems in accordance with aspects of the present disclosure.

FIG. 5 shows a block diagram 500 of a system 505 that supports improved anomaly detection for computing systems in accordance with aspects of the present disclosure. In some examples, the system 505 may be an example of aspects of one or more components described with reference to FIG. 1, such as a DMS 110. The system 505 may include an input interface 510, an output interface 515, and an anomaly detection component 520. The system 505 may also include one or more processors. Each of these components may be in communication with one another (e.g., via one or more buses, communications links, communications interfaces, or any combination thereof).

The input interface 510 may manage input signaling for the system 505. For example, the input interface 510 may receive input signaling (e.g., messages, packets, data, instructions, commands, or any other form of encoded information) from other systems or devices. The input interface 510 may send signaling corresponding to (e.g., representative of or otherwise based on) such input signaling to other components of the system 505 for processing. For example, the input interface 510 may transmit such corresponding signaling to the anomaly detection component 520 to support improved anomaly detection for computing systems. In some cases, the input interface 510 may be a component of a network interface 725 as described with reference to FIG. 7.

The output interface 515 may manage output signaling for the system 505. For example, the output interface 515 may receive signaling from other components of the system 505, such as the anomaly detection component 520, and may transmit such output signaling corresponding to (e.g., representative of or otherwise based on) such signaling to other systems or devices. In some cases, the output interface 515 may be a component of a network interface 725 as described with reference to FIG. 7.

For example, the anomaly detection component 520 may include a snapshot capturing component 525, a comparing component 530, a file identification component 535, a ratio identification component 540, an alert component 545, or any combination thereof. In some examples, the anomaly detection component 520, or various components thereof, may be configured to perform various operations (e.g., receiving, monitoring, transmitting) using or otherwise in cooperation with the input interface 510, the output interface 515, or both. For example, the anomaly detection component 520 may receive information from the input interface 510, send information to the output interface 515, or be integrated in combination with the input interface 510, the output interface 515, or both to receive information, transmit information, or perform various other operations as described herein.

The snapshot capturing component 525 may be configured as or otherwise support a means for capturing a first snapshot of a target computing system at a first time. The snapshot capturing component 525 may be configured as or otherwise support a means for capturing a second snapshot of the target computing system at a second time that is later than the first time. The comparing component 530 may be configured as or otherwise support a means for comparing the second snapshot with the first snapshot to identify whether a set of multiple files, for the target computing system, deleted between the first time and the second time includes a quantity of deleted files that satisfies a file deletion threshold. The file identification component 535 may be configured as or otherwise support a means for using metadata associated with the target computing system to identify, based on the quantity of deleted files satisfying the file deletion threshold, a subset of the set of multiple deleted files as corresponding to one or more system files. The ratio identification component 540 may be configured as or otherwise support a means for determining whether a ratio between a first value of a deletion metric for the subset of the set of multiple deleted files and a second value of the deletion metric for the set of multiple deleted files satisfies a threshold ratio. The alert component 545 may be configured as or otherwise support a means for refraining from generating an alert, despite the quantity of deleted files satisfying the file deletion threshold, based on the ratio between the first value of the deletion metric and the second value of the deletion metric satisfying the threshold ratio.

Figure 6:
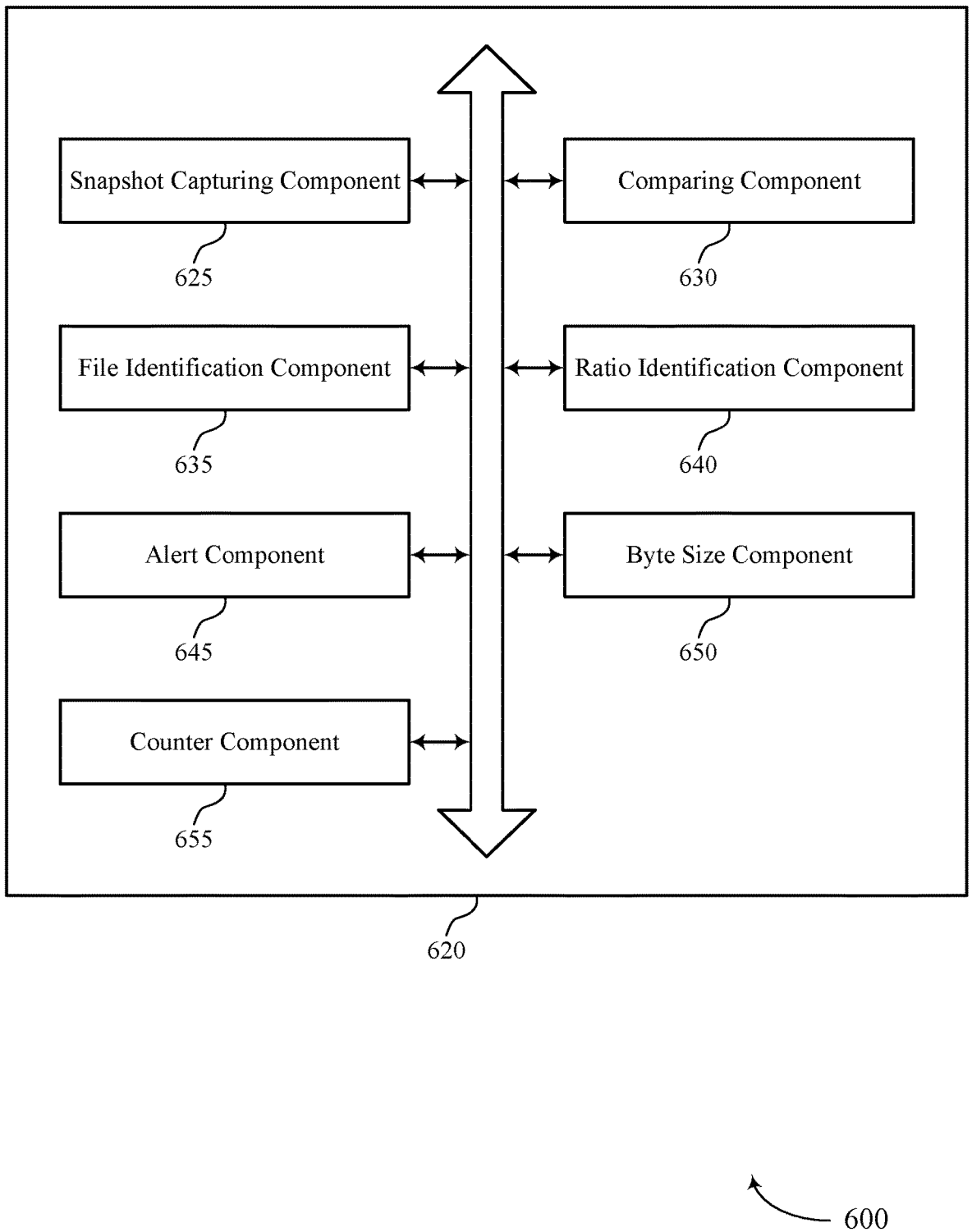
FIG. 6 shows a block diagram of an anomaly detection component that supports improved anomaly detection for computing systems in accordance with aspects of the present disclosure.

FIG. 6 shows a block diagram 600 of an anomaly detection component 620 that supports improved anomaly detection for computing systems in accordance with aspects of the present disclosure. The anomaly detection component 620 may be an example of aspects of an anomaly detection component or an anomaly detection component 520, or both, as described herein. The anomaly detection component 620, or various components thereof, may be an example of means for performing various aspects of improved anomaly detection for computing systems as described herein. For example, the anomaly detection component 620 may include a snapshot capturing component 625, a comparing component 630, a file identification component 635, a ratio identification component 640, an alert component 645, a byte size component 650, a counter component 655, or any combination thereof. Each of these components, or components of subcomponents thereof (e.g., one or more processors, one or more memories), may communicate, directly or indirectly, with one another (e.g., via one or more buses, communications links, communications interfaces, or any combination thereof).

The snapshot capturing component 625 may be configured as or otherwise support a means for capturing a first snapshot of a target computing system at a first time. In some examples, the snapshot capturing component 625 may be configured as or otherwise support a means for capturing a second snapshot of the target computing system at a second time that is later than the first time. The comparing component 630 may be configured as or otherwise support a means for comparing the second snapshot with the first snapshot to identify whether a set of multiple files, for the target computing system, deleted between the first time and the second time includes a quantity of deleted files that satisfies a file deletion threshold. The file identification component 635 may be configured as or otherwise support a means for using metadata associated with the target computing system to identify, based on the quantity of deleted files satisfying the file deletion threshold, a subset of the set of multiple deleted files as corresponding to one or more system files. The ratio identification component 640 may be configured as or otherwise support a means for determining whether a ratio between a first value of a deletion metric for the subset of the set of multiple deleted files and a second value of the deletion metric for the set of multiple deleted files satisfies a threshold ratio. The alert component 645 may be configured as or otherwise support a means for refraining from generating an alert, despite the quantity of deleted files satisfying the file deletion threshold, based on the ratio between the first value of the deletion metric and the second value of the deletion metric satisfying the threshold ratio.

In some examples, the first value of the deletion metric is a quantity of files identified as corresponding to one or more system files. In some examples, the second value of the deletion metric is the quantity of deleted files. In some examples, the threshold ratio is a system file count ratio threshold.

In some examples, the counter component 655 may be configured as or otherwise support a means for, for each file that is identified from among the set of multiple deleted files as corresponding to a system file, incrementing a counter, where a value of the counter indicates the quantity of files identified as corresponding to one or more system files.

In some examples, the file identification component 635 may be configured as or otherwise support a means for identifying one or more temporary files from among the set of multiple deleted files, where the one or more temporary files are included in the quantity of files identified as corresponding to one or more system files.

In some examples, the byte size component 650 may be configured as or otherwise support a means for determining a first collective byte size corresponding to the subset of the set of multiple deleted files identified as corresponding to one or more system files. In some examples, the byte size component 650 may be configured as or otherwise support a means for determining a second collective byte size (e.g. total byte size) corresponding to the set of multiple deleted files, where the first value of the deletion metric is the first collective byte size and the second value of the deletion metric is the second collective byte size, and where the threshold ratio is a system file bytes count ratio threshold.

In some examples, the counter component 655 may be configured as or otherwise support a means for, for each file that is identified from among the set of multiple deleted files as corresponding to a system file, incrementing a counter by an amount that is based on a byte size of the file, where a value of the counter indicates the first collective byte size.

In some examples, the file identification component 635 may be configured as or otherwise support a means for identifying one or more temporary files from among the set of multiple deleted files, where the one or more temporary files are included in the subset of the set of multiple deleted files identified as corresponding to one or more system files.

In some examples, the file identification component 635 may be configured as or otherwise support a means for determining a set of multiple filepaths, where each filepath of the set of multiple filepaths corresponds to a respective deleted file of the set of multiple deleted files, and a means for identifying the subset of the set of multiple deleted files as corresponding to the one or more system files based on the set of multiple filepaths.

In some examples, the ratio identification component 640 may be configured as or otherwise support a means for determining the threshold ratio based on quantities of deleted files or deleted bytes associated with snapshots of the target computing system that were captured prior to the first time.

In some examples, the snapshot capturing component 625 may be configured as or otherwise support a means for capturing a third snapshot of the target computing system at a third time. In some examples, the snapshot capturing component 625 may be configured as or otherwise support a means for capturing a fourth snapshot of the target computing system at a fourth time that is later than the third time. In some examples, the comparing component 630 may be configured as or otherwise support a means for comparing the fourth snapshot with the third snapshot to identify whether a second set of multiple files, for the target computing system, deleted between the third time and the fourth time includes a second quantity of deleted files that satisfies the file deletion threshold. In some examples, the file identification component 635 may be configured as or otherwise support a means for using second metadata associated with the target computing system to identify, based on the second quantity of deleted files satisfying the file deletion threshold, a second subset of the second set of multiple deleted files as corresponding to one or more system files. In some examples, the ratio identification component 640 may be configured as or otherwise support a means for determining that a second ratio between a third value of the deletion metric for the second subset of the second set of multiple deleted files and a fourth value of the deletion metric for the second set of multiple deleted files fails to satisfy the threshold ratio. In some examples, the alert component 645 may be configured as or otherwise support a means for generating the alert based on the ratio between the third value of the deletion metric and the fourth value of the deletion metric failing to satisfy the threshold ratio. In some examples, the alert indicates a malicious activity on the target computing system.

Figure 7:
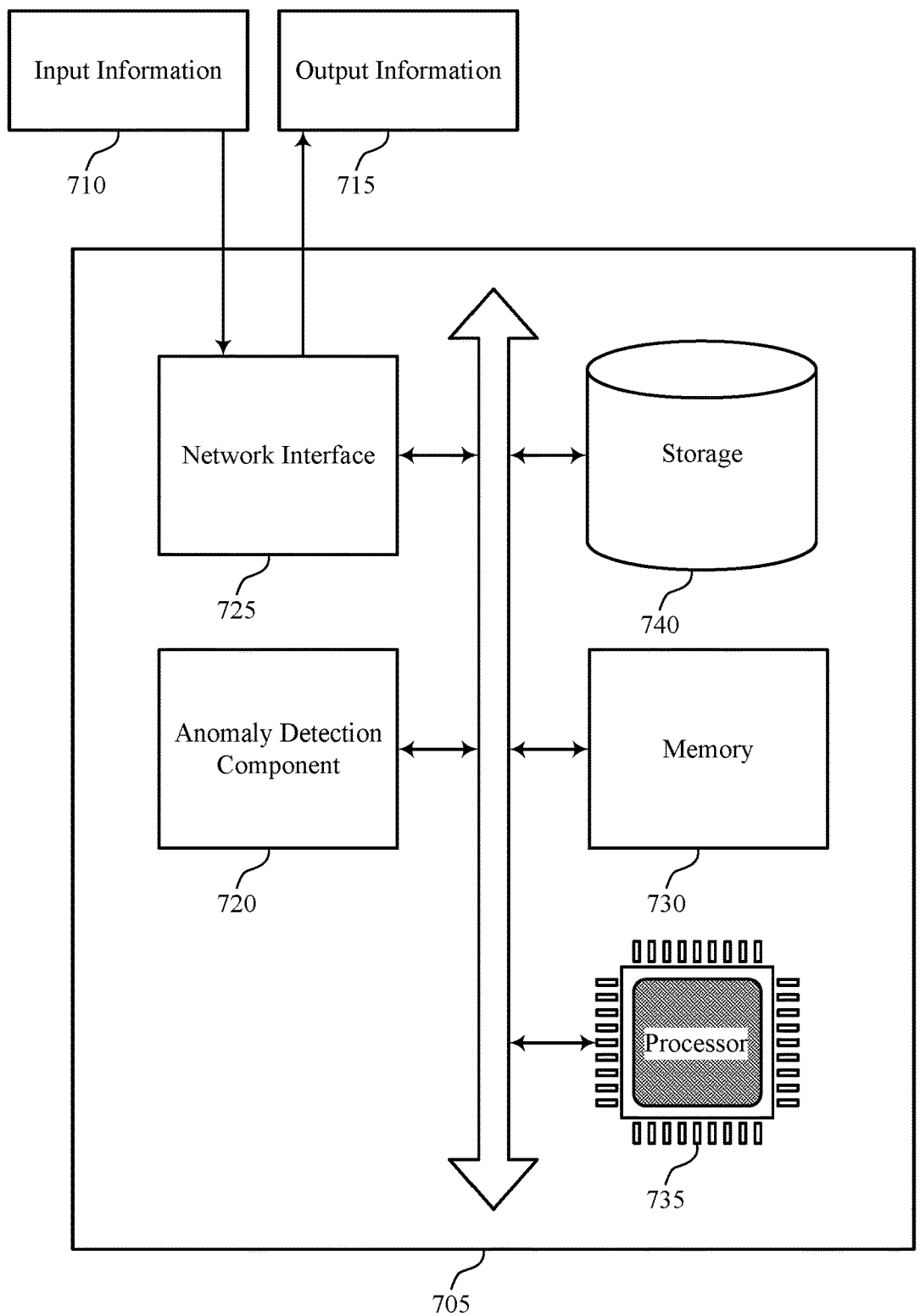
FIG. 7 shows a diagram of a system including a device that supports improved anomaly detection for computing systems in accordance with aspects of the present disclosure.

FIG. 7 shows a block diagram 700 of a system 705 that supports improved anomaly detection for computing systems in accordance with aspects of the present disclosure. The system 705 may be an example of or include components of a system 505 as described herein. The system 705 may include components for data management, including components such as an anomaly detection component 720, an input information 710, an output information 715, a network interface 725, at least one memory 730, at least one processor 735, and a storage 740. These components may be in electronic communication or otherwise coupled with each other (e.g., operatively, communicatively, functionally, electronically, electrically; via one or more buses, communications links, communications interfaces, or any combination thereof). Additionally, the components of the system 705 may include corresponding physical components or may be implemented as corresponding virtual components (e.g., components of one or more virtual machines). In some examples, the system 705 may be an example of aspects of one or more components described with reference to FIG. 1, such as a DMS 110.

The network interface 725 may enable the system 705 to exchange information (e.g., input information 710, output information 715, or both) with other systems or devices (not shown). For example, the network interface 725 may enable the system 705 to connect to a network (e.g., a network 120 as described herein). The network interface 725 may include one or more wireless network interfaces, one or more wired network interfaces, or any combination thereof. In some examples, the network interface 725 may be an example of may be an example of aspects of one or more components described with reference to FIG. 1, such as one or more network interfaces 165.

Memory 730 may include RAM, ROM, or both. The memory 730 may store computer-readable, computer-executable software including instructions that, when executed, cause the processor 735 to perform various functions described herein. In some cases, the memory 730 may contain, among other things, a basic input/output system (BIOS), which may control basic hardware or software operation such as the interaction with peripheral components or devices. In some cases, the memory 730 may be an example of aspects of one or more components described with reference to FIG. 1, such as one or more memories 175.

The processor 735 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 735 may be configured to execute computer-readable instructions stored in a memory 730 to perform various functions (e.g., functions or tasks supporting improved anomaly detection for computing systems). Though a single processor 735 is depicted in the example of FIG. 7, it is to be understood that the system 705 may include any quantity of one or more of processors 735 and that a group of processors 735 may collectively perform one or more functions ascribed herein to a processor, such as the processor 735. In some cases, the processor 735 may be an example of aspects of one or more components described with reference to FIG. 1, such as one or more processors 170.

Storage 740 may be configured to store data that is generated, processed, stored, or otherwise used by the system 705. In some cases, the storage 740 may include one or more HDDs, one or more SDDs, or both. In some examples, the storage 740 may be an example of a single database, a distributed database, multiple distributed databases, a data store, a data lake, or an emergency backup database. In some examples, the storage 740 may be an example of one or more components described with reference to FIG. 1, such as one or more network disks 180.

For example, the anomaly detection component 720 may be configured as or otherwise support a means for capturing a first snapshot of a target computing system at a first time. The anomaly detection component 720 may be configured as or otherwise support a means for capturing a second snapshot of the target computing system at a second time that is later than the first time. The anomaly detection component 720 may be configured as or otherwise support a means for comparing the second snapshot with the first snapshot to identify whether a set of multiple files, for the target computing system, deleted between the first time and the second time includes a quantity of deleted files that satisfies a file deletion threshold. The anomaly detection component 720 may be configured as or otherwise support a means for using metadata associated with the target computing system to identify, based on the quantity of deleted files satisfying the file deletion threshold, a subset of the set of multiple deleted files as corresponding to one or more system files. The anomaly detection component 720 may be configured as or otherwise support a means for determining whether a ratio between a first value of a deletion metric for the subset of the set of multiple deleted files and a second value of the deletion metric for the set of multiple deleted files satisfies a threshold ratio. The anomaly detection component 720 may be configured as or otherwise support a means for refraining from generating an alert, despite the quantity of deleted files satisfying the file deletion threshold, based on the ratio between the first value of the deletion metric and the second value of the deletion metric satisfying the threshold ratio.

By including or configuring the anomaly detection component 720 in accordance with examples as described herein, the system 705 may support techniques for improved anomaly detection for computing systems, which may provide one or more benefits such as, for example, improved reliability, reduced latency, and improved user experience, among other possibilities.

Figure 8:
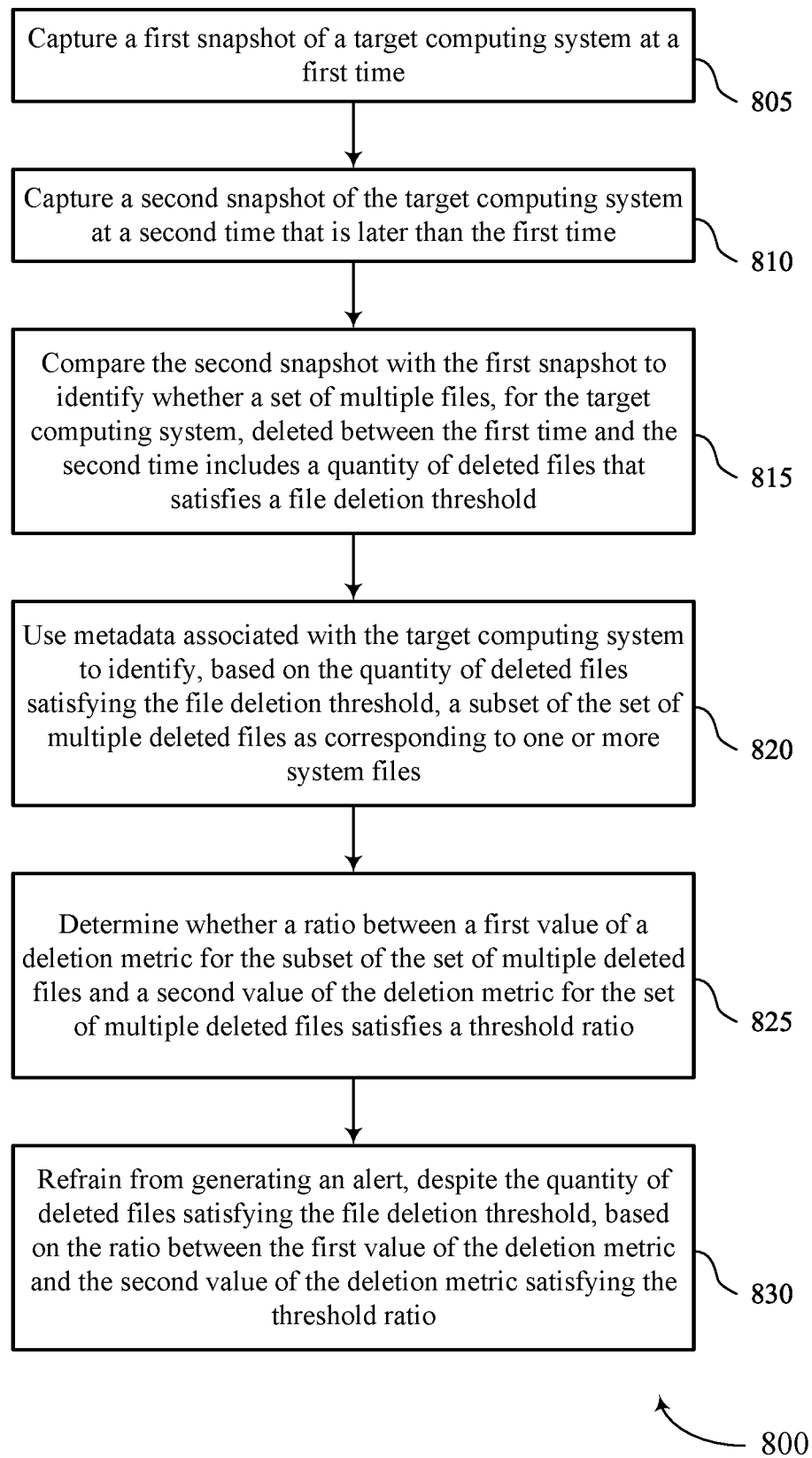
FIGS. 8 through 10 show flowcharts illustrating methods that support improved anomaly detection for computing systems in accordance with aspects of the present disclosure.

FIG. 8 shows a flowchart illustrating a method 800 that supports improved anomaly detection for computing systems in accordance with aspects of the present disclosure. The operations of the method 800 may be implemented by a DMS or its components as described herein. For example, the operations of the method 800 may be performed by a DMS as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 805, the method may include capturing a first snapshot of a target computing system at a first time. The operations of 805 may be performed in accordance with examples as disclosed herein. In some examples, aspects of the operations of 805 may be performed by a snapshot capturing component 625 as described with reference to FIG. 6.

At 810, the method may include capturing a second snapshot of the target computing system at a second time that is later than the first time. The operations of 810 may be performed in accordance with examples as disclosed herein. In some examples, aspects of the operations of 810 may be performed by a snapshot capturing component 625 as described with reference to FIG. 6.

At 815, the method may include comparing the second snapshot with the first snapshot to identify whether a set of multiple files, for the target computing system, deleted between the first time and the second time includes a quantity of deleted files that satisfies a file deletion threshold. The operations of 815 may be performed in accordance with examples as disclosed herein. In some examples, aspects of the operations of 815 may be performed by a comparing component 630 as described with reference to FIG. 6.

At 820, the method may include using metadata associated with the target computing system to identify, based on the quantity of deleted files satisfying the file deletion threshold, a subset of the set of multiple deleted files as corresponding to one or more system files. The operations of 820 may be performed in accordance with examples as disclosed herein. In some examples, aspects of the operations of 820 may be performed by a file identification component 635 as described with reference to FIG. 6.

At 825, the method may include determining whether a ratio between a first value of a deletion metric for the subset of the set of multiple deleted files and a second value of the deletion metric for the set of multiple deleted files satisfies a threshold ratio. The operations of 825 may be performed in accordance with examples as disclosed herein. In some examples, aspects of the operations of 825 may be performed by a ratio identification component 640 as described with reference to FIG. 6.

At 830, the method may include refraining from generating an alert, despite the quantity of deleted files satisfying the file deletion threshold, based on the ratio between the first value of the deletion metric and the second value of the deletion metric satisfying the threshold ratio. The operations of 830 may be performed in accordance with examples as disclosed herein. In some examples, aspects of the operations of 830 may be performed by an alert component 645 as described with reference to FIG. 6.

Figure 9:
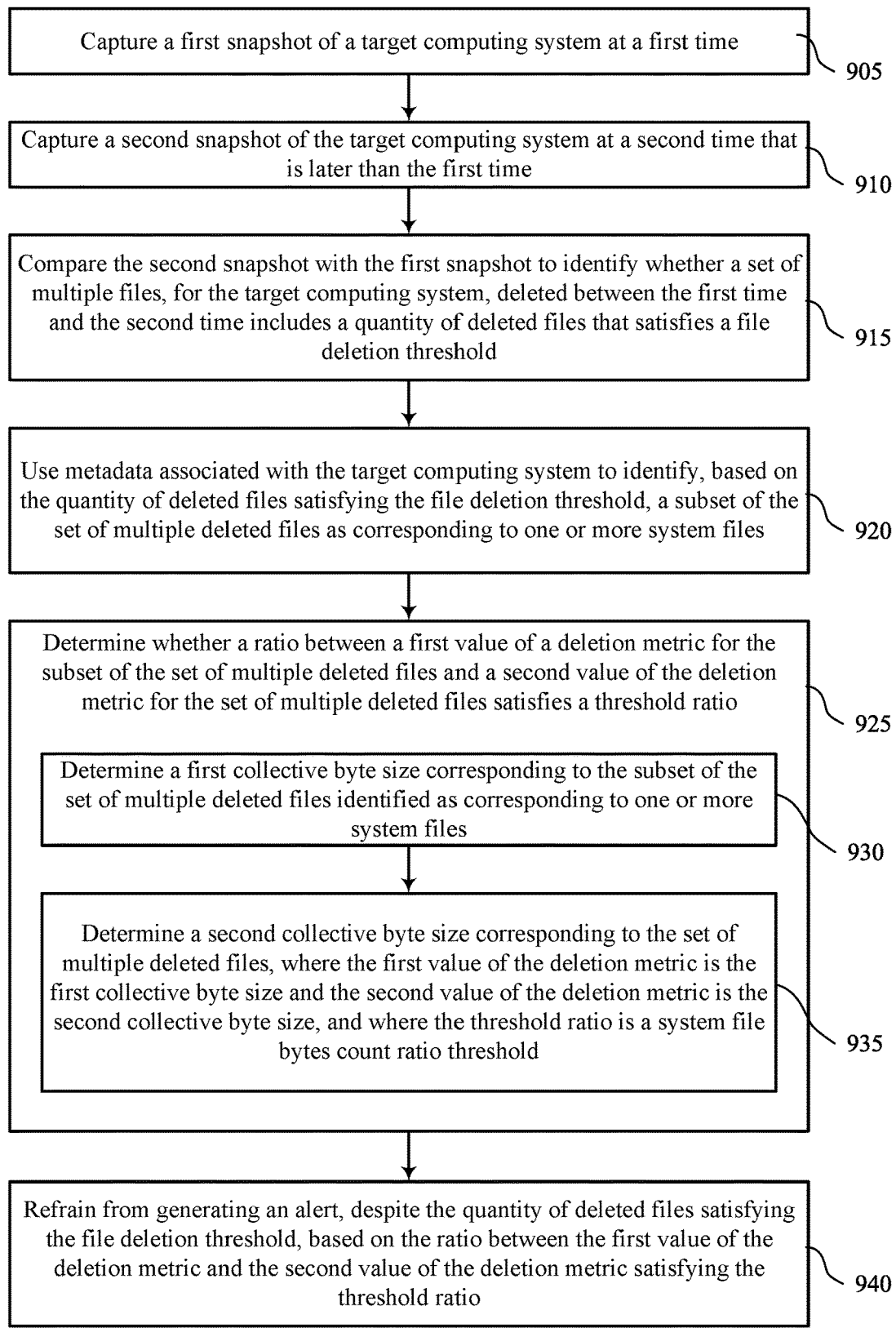

FIG. 9 shows a flowchart illustrating a method 900 that supports improved anomaly detection for computing systems in accordance with aspects of the present disclosure. The operations of the method 900 may be implemented by a DMS or its components as described herein. For example, the operations of the method 900 may be performed by a DMS as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 905, the method may include capturing a first snapshot of a target computing system at a first time. The operations of 905 may be performed in accordance with examples as disclosed herein. In some examples, aspects of the operations of 905 may be performed by a snapshot capturing component 625 as described with reference to FIG. 6.

At 910, the method may include capturing a second snapshot of the target computing system at a second time that is later than the first time. The operations of 910 may be performed in accordance with examples as disclosed herein. In some examples, aspects of the operations of 910 may be performed by a snapshot capturing component 625 as described with reference to FIG. 6.

At 915, the method may include comparing the second snapshot with the first snapshot to identify whether a set of multiple files, for the target computing system, deleted between the first time and the second time includes a quantity of deleted files that satisfies a file deletion threshold. The operations of 915 may be performed in accordance with examples as disclosed herein. In some examples, aspects of the operations of 915 may be performed by a comparing component 630 as described with reference to FIG. 6.

At 920, the method may include using metadata associated with the target computing system to identify, based on the quantity of deleted files satisfying the file deletion threshold, a subset of the set of multiple deleted files as corresponding to one or more system files. The operations of 920 may be performed in accordance with examples as disclosed herein. In some examples, aspects of the operations of 920 may be performed by a file identification component 635 as described with reference to FIG. 6.

At 925, the method may include determining whether a ratio between a first value of a deletion metric for the subset of the set of multiple deleted files and a second value of the deletion metric for the set of multiple deleted files satisfies a threshold ratio. The operations of 925 may be performed in accordance with examples as disclosed herein. In some examples, aspects of the operations of 925 may be performed by a ratio identification component 640 as described with reference to FIG. 6.

In some examples, operations at 925 may include, at 930, determining a first collective byte size corresponding to the subset of the set of multiple deleted files identified as corresponding to one or more system files. The operations of 930 may be performed in accordance with examples as disclosed herein. In some examples, aspects of the operations of 930 may be performed by a byte size component 650 as described with reference to FIG. 6.

In some examples, operations at 925 may further include, at 935, determining a second collective byte size corresponding to the set of multiple deleted files, where the first value of the deletion metric is the first collective byte size and the second value of the deletion metric is the second collective byte size, and where the threshold ratio is a system file bytes count ratio threshold. The operations of 935 may be performed in accordance with examples as disclosed herein. In some examples, aspects of the operations of 935 may be performed by a byte size component 650 as described with reference to FIG. 6.

At 940, the method may include refraining from generating an alert, despite the quantity of deleted files satisfying the file deletion threshold, based on the ratio between the first value of the deletion metric and the second value of the deletion metric satisfying the threshold ratio. The operations of 940 may be performed in accordance with examples as disclosed herein. In some examples, aspects of the operations of 940 may be performed by an alert component 645 as described with reference to FIG. 6.

Figure 10:
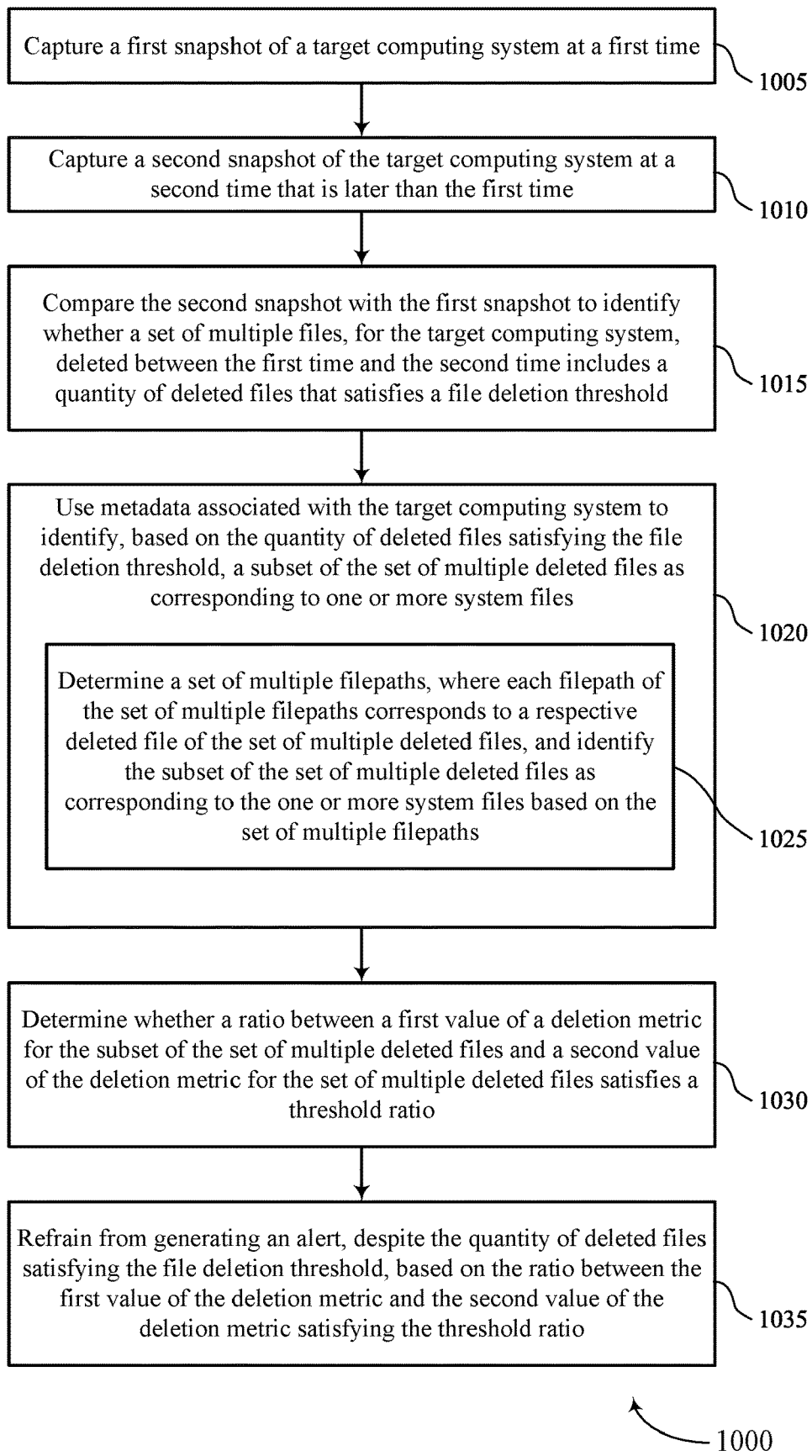

FIG. 10 shows a flowchart illustrating a method 1000 that supports improved anomaly detection for computing systems in accordance with aspects of the present disclosure. The operations of the method 1000 may be implemented by a DMS or its components as described herein. For example, the operations of the method 1000 may be performed by a DMS as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 1005, the method may include capturing a first snapshot of a target computing system at a first time. The operations of 1005 may be performed in accordance with examples as disclosed herein. In some examples, aspects of the operations of 1005 may be performed by a snapshot capturing component 625 as described with reference to FIG. 6.

At 1010, the method may include capturing a second snapshot of the target computing system at a second time that is later than the first time. The operations of 1010 may be performed in accordance with examples as disclosed herein. In some examples, aspects of the operations of 1010 may be performed by a snapshot capturing component 625 as described with reference to FIG. 6.

At 1015, the method may include comparing the second snapshot with the first snapshot to identify whether a set of multiple files, for the target computing system, deleted between the first time and the second time includes a quantity of deleted files that satisfies a file deletion threshold. The operations of 1015 may be performed in accordance with examples as disclosed herein. In some examples, aspects of the operations of 1015 may be performed by a comparing component 630 as described with reference to FIG. 6.

At 1020, the method may include using metadata associated with the target computing system to identify, based on the quantity of deleted files satisfying the file deletion threshold, a subset of the set of multiple deleted files as corresponding to one or more system files. The operations of 1020 may be performed in accordance with examples as disclosed herein. In some examples, aspects of the operations of 1020 may be performed by a file identification component 635 as described with reference to FIG. 6.

In some examples, operations at 1020 may include, at 1025, determining a set of multiple filepaths, where each filepath of the set of multiple filepaths corresponds to a respective deleted file of the set of multiple deleted files, and identifying the subset of the set of multiple deleted files as corresponding to the one or more system files based on the set of multiple filepaths. The operations of 1025 may be performed in accordance with examples as disclosed herein. In some examples, aspects of the operations of 1025 may be performed by a file identification component 635 as described with reference to FIG. 6.

At 1030, the method may include determining whether a ratio between a first value of a deletion metric for the subset of the set of multiple deleted files and a second value of the deletion metric for the set of multiple deleted files satisfies a threshold ratio. The operations of 1030 may be performed in accordance with examples as disclosed herein. In some examples, aspects of the operations of 1030 may be performed by a ratio identification component 640 as described with reference to FIG. 6.

At 1035, the method may include refraining from generating an alert, despite the quantity of deleted files satisfying the file deletion threshold, based on the ratio between the first value of the deletion metric and the second value of the deletion metric satisfying the threshold ratio. The operations of 1035 may be performed in accordance with examples as disclosed herein. In some examples, aspects of the operations of 1035 may be performed by an alert component 645 as described with reference to FIG. 6.

A method by an apparatus is described. The method may include capturing a first snapshot of a target computing system at a first time, capturing a second snapshot of the target computing system at a second time that is later than the first time, comparing the second snapshot with the first snapshot to identify whether a set of multiple files, for the target computing system, deleted between the first time and the second time includes a quantity of deleted files that satisfies a file deletion threshold, using metadata associated with the target computing system to identify, based on the quantity of deleted files satisfying the file deletion threshold, a subset of the set of multiple deleted files as corresponding to one or more system files, determining whether a ratio between a first value of a deletion metric for the subset of the set of multiple deleted files and a second value of the deletion metric for the set of multiple deleted files satisfies a threshold ratio, and refraining from generating an alert, despite the quantity of deleted files satisfying the file deletion threshold, based on the ratio between the first value of the deletion metric and the second value of the deletion metric satisfying the threshold ratio.

An apparatus is described. The apparatus may include one or more memories storing processor executable code, and one or more processors coupled with the one or more memories. The one or more processors may individually or collectively be operable to execute the code to cause the apparatus to capture a first snapshot of a target computing system at a first time, capture a second snapshot of the target computing system at a second time that is later than the first time, compare the second snapshot with the first snapshot to identify whether a set of multiple files, for the target computing system, deleted between the first time and the second time includes a quantity of deleted files that satisfies a file deletion threshold, use metadata associated with the target computing system to identify, based on the quantity of deleted files satisfying the file deletion threshold, a subset of the set of multiple deleted files as corresponding to one or more system files, determine whether a ratio between a first value of a deletion metric for the subset of the set of multiple deleted files and a second value of the deletion metric for the set of multiple deleted files satisfies a threshold ratio, and refrain from generating an alert, despite the quantity of deleted files satisfying the file deletion threshold, based on the ratio between the first value of the deletion metric and the second value of the deletion metric satisfying the threshold ratio.

Another apparatus is described. The apparatus may include means for capturing a first snapshot of a target computing system at a first time, means for capturing a second snapshot of the target computing system at a second time that is later than the first time, means for comparing the second snapshot with the first snapshot to identify whether a set of multiple files, for the target computing system, deleted between the first time and the second time includes a quantity of deleted files that satisfies a file deletion threshold, means for using metadata associated with the target computing system to identify, based on the quantity of deleted files satisfying the file deletion threshold, a subset of the set of multiple deleted files as corresponding to one or more system files, means for determining whether a ratio between a first value of a deletion metric for the subset of the set of multiple deleted files and a second value of the deletion metric for the set of multiple deleted files satisfies a threshold ratio, and means for refraining from generating an alert, despite the quantity of deleted files satisfying the file deletion threshold, based on the ratio between the first value of the deletion metric and the second value of the deletion metric satisfying the threshold ratio.

A non-transitory computer-readable medium storing code is described. The code may include instructions executable by one or more processors to capture a first snapshot of a target computing system at a first time, capture a second snapshot of the target computing system at a second time that is later than the first time, compare the second snapshot with the first snapshot to identify whether a set of multiple files, for the target computing system, deleted between the first time and the second time includes a quantity of deleted files that satisfies a file deletion threshold, use metadata associated with the target computing system to identify, based on the quantity of deleted files satisfying the file deletion threshold, a subset of the set of multiple deleted files as corresponding to one or more system files, determine whether a ratio between a first value of a deletion metric for the subset of the set of multiple deleted files and a second value of the deletion metric for the set of multiple deleted files satisfies a threshold ratio, and refrain from generating an alert, despite the quantity of deleted files satisfying the file deletion threshold, based on the ratio between the first value of the deletion metric and the second value of the deletion metric satisfying the threshold ratio.

In some examples of the method, apparatus, and non-transitory computer-readable medium described herein, the first value of the deletion metric is a quantity of files identified as corresponding to one or more system files, the second value of the deletion metric is the quantity of deleted files, and the threshold ratio is a system file count ratio threshold.

In some examples of the method, apparatus, and non-transitory computer-readable medium described herein, for each file that is identified from among the set of multiple deleted files as corresponding to a system file, incrementing a counter, where a value of the counter indicates the quantity of files identified as corresponding to one or more system files.

Some examples of the method, apparatus, and non-transitory computer-readable medium described herein may further include operations, features, means, or instructions for identifying one or more temporary files from among the set of multiple deleted files, where the one or more temporary files may be included in the quantity of files identified as corresponding to one or more system files.

Some examples of the method, apparatus, and non-transitory computer-readable medium described herein may further include operations, features, means, or instructions for determining a first collective byte size corresponding to the subset of the set of multiple deleted files identified as corresponding to one or more system files and determining a second collective byte size corresponding to the set of multiple deleted files, where the first value of the deletion metric is the first collective byte size and the second value of the deletion metric is the second collective byte size, and where the threshold ratio is a system file bytes count ratio threshold.

In some examples of the method, apparatus, and non-transitory computer-readable medium described herein, for each file that is identified from among the set of multiple deleted files as corresponding to a system file, incrementing a counter by an amount that may be based on a byte size of the file, where a value of the counter indicates the first collective byte size.

Some examples of the method, apparatus, and non-transitory computer-readable medium described herein may further include operations, features, means, or instructions for identifying one or more temporary files from among the set of multiple deleted files, where the one or more temporary files may be included in the subset of the set of multiple deleted files identified as corresponding to one or more system files.

In some examples of the method, apparatus, and non-transitory computer-readable medium described herein, operations, features, means, or instructions for using metadata associated with the target computing system to identify, based on the quantity of deleted files satisfying the file deletion threshold, a subset of the set of multiple deleted files as corresponding to one or more system files may include operations, features, means, or instructions for determining a set of multiple filepaths, where each filepath of the set of multiple filepaths corresponds to a respective deleted file of the set of multiple deleted files, and identifying the subset of the set of multiple deleted files as corresponding to the one or more system files based on the set of multiple filepaths.

Some examples of the method, apparatus, and non-transitory computer-readable medium described herein may further include operations, features, means, or instructions for determining the threshold ratio based on quantities of deleted files or deleted bytes associated with snapshots of the target computing system that were captured prior to the first time.

Some examples of the method, apparatus, and non-transitory computer-readable medium described herein may further include operations, features, means, or instructions for capturing a third snapshot of the target computing system at a third time, capturing a fourth snapshot of the target computing system at a fourth time that may be later than the third time, comparing the fourth snapshot with the third snapshot to identify whether a second set of multiple files, for the target computing system, deleted between the third time and the fourth time includes a second quantity of deleted files that satisfies the file deletion threshold, using second metadata associated with the target computing system to identify, based on the second quantity of deleted files satisfying the file deletion threshold, a second subset of the second set of multiple deleted files as corresponding to one or more system files, determining that a second ratio between a third value of the deletion metric for the second subset of the second set of multiple deleted files and a fourth value of the deletion metric for the second set of multiple deleted files fails to satisfy the threshold ratio, and generating the alert based on the ratio between the third value of the deletion metric and the fourth value of the deletion metric failing to satisfy the threshold ratio.

In some examples of the method, apparatus, and non-transitory computer-readable medium described herein, the alert indicates a malicious activity on the target computing system.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns.

Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, "a component" having characteristics or performing functions may refer to "at least one of one or more components" having a particular characteristic or performing a particular function. Subsequent reference to a component introduced with the article "a" using the terms "the" or "said" refers to any or all of the one or more components. For example, a component introduced with the article "a" shall be understood to mean "one or more components," and referring to "the component" subsequently in the claims shall be understood to be equivalent to referring to "at least one of the one or more components."

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method comprising:
   storing, at a control plane of a data management system, a first snapshot captured of a target computing system at a first time;
   storing, at the control plane of the data management system, a second snapshot of the target computing system at a second time that is later than the first time;
   comparing the second snapshot with the first snapshot to identify whether a plurality of deleted files, for the target computing system, deleted between the first time and the second time comprises a quantity of deleted files that satisfies a file deletion threshold;
   using metadata associated with the target computing system to identify, based at least in part on the quantity of deleted files satisfying the file deletion threshold, a subset of the plurality of deleted files as corresponding to one or more system files;
   determining whether a ratio between a first value of a deletion metric for the subset of the plurality of deleted files and a second value of the deletion metric for the plurality of deleted files satisfies a threshold ratio; and
   transmitting an alert based at least in part on the quantity of deleted files satisfying the file deletion threshold and the ratio between the first value of the deletion metric and the second value of the deletion metric failing to satisfy the threshold ratio.

2. The method of claim 1, wherein the first value of the deletion metric comprises a quantity of files identified as corresponding to the one or more system files, the second value of the deletion metric comprises the quantity of deleted files, and the threshold ratio comprises a system file count ratio threshold.

3. The method of claim 2, further comprising:
   for each file that is identified from among the plurality of deleted files as corresponding to a system file, incrementing a counter, wherein a value of the counter indicates the quantity of files identified as corresponding to the one or more system files.

4. The method of claim 2, further comprising:
   identifying one or more temporary files from among the plurality of deleted files, wherein the one or more temporary files are included in the quantity of files identified as corresponding to the one or more system files.

5. The method of claim 1, further comprising:
   determining a first collective byte size corresponding to the subset of the plurality of deleted files identified as corresponding to the one or more system files; and
   determining a second collective byte size corresponding to the plurality of deleted files, wherein the first value of the deletion metric comprises the first collective byte size and the second value of the deletion metric comprises the second collective byte size, and wherein the threshold ratio comprises a system file bytes count ratio threshold.

6. The method of claim 5, further comprising:
   for each file that is identified from among the plurality of deleted files as corresponding to a system file, incrementing a counter by an amount that is based at least in part on a byte size of the system file, wherein a value of the counter indicates the first collective byte size.

7. The method of claim 5, further comprising:
   identifying one or more temporary files from among the plurality of deleted files, wherein the one or more temporary files are included in the subset of the plurality of deleted files identified as corresponding to the one or more system files.

8. The method of claim 1, wherein using the metadata associated with the target computing system to identify the subset of the plurality of deleted files as corresponding to the one or more system files comprises:
   determining a plurality of filepaths, wherein each filepath of the plurality of filepaths corresponds to a respective deleted file of the plurality of deleted files; and
   identifying the subset of the plurality of deleted files as corresponding to the one or more system files based at least in part on the plurality of filepaths.

9. The method of claim 1, further comprising:
   determining the threshold ratio based at least in part on quantities of deleted files or deleted bytes associated with snapshots of the target computing system that were captured prior to the first time.

10. The method of claim 1, further comprising:
    capturing a third snapshot of the target computing system at a third time;
    capturing a fourth snapshot of the target computing system at a fourth time that is later than the third time;
    comparing the fourth snapshot with the third snapshot to identify whether a second plurality of deleted files, for the target computing system, deleted between the third time and the fourth time comprises a second quantity of deleted files that satisfies the file deletion threshold;
    using second metadata associated with the target computing system to identify, based at least in part on the second quantity of deleted files satisfying the file deletion threshold, a second subset of the second plurality of deleted files as corresponding to the one or more system files;

determining that a second ratio between a third value of the deletion metric for the second subset of the second plurality of deleted files and a fourth value of the deletion metric for the second plurality of deleted files satisfies the threshold ratio; and refraining from transmitting the alert despite the second quantity of deleted files satisfying the file deletion threshold based at least in part on the ratio between the third value of the deletion metric and the fourth value of the deletion metric satisfying the threshold ratio.

11. The method of claim 10, wherein the alert indicates a malicious activity on the target computing system.

12. An apparatus, comprising:
one or more memories storing processor-executable code; and
one or more processors coupled with the one or more memories and individually or collectively operable to execute the code to cause the apparatus to:
store, at a control plane of a data management system, a first snapshot captured of a target computing system at a first time;
store, at the control plane of the data management system, a second snapshot of the target computing system at a second time that is later than the first time;
compare the second snapshot with the first snapshot to identify whether a plurality of deleted files, for the target computing system, deleted between the first time and the second time comprises a quantity of deleted files that satisfies a file deletion threshold;
use metadata associated with the target computing system to identify, based at least in part on the quantity of deleted files satisfying the file deletion threshold, a subset of the plurality of deleted files as corresponding to one or more system files;
determine whether a ratio between a first value of a deletion metric for the subset of the plurality of deleted files and a second value of the deletion metric for the plurality of deleted files satisfies a threshold ratio; and
transmit an alert based at least in part on the quantity of deleted files satisfying the file deletion threshold and the ratio between the first value of the deletion metric and the second value of the deletion metric failing to satisfy the threshold ratio.

13. The apparatus of claim 12, wherein the first value of the deletion metric comprises a quantity of files identified as corresponding to the one or more system files, the second value of the deletion metric comprises the quantity of deleted files, and the threshold ratio comprises a system file count ratio threshold.

14. The apparatus of claim 13, wherein the one or more processors are individually or collectively further operable to execute the code to cause the apparatus to:
for each file that is identified from among the plurality of deleted files as corresponding to a system file, increment a counter, wherein a value of the counter indicates the quantity of files identified as corresponding to the one or more system files.

15. The apparatus of claim 13, wherein the one or more processors are individually or collectively further operable to execute the code to cause the apparatus to:
identify one or more temporary files from among the plurality of deleted files, wherein the one or more temporary files are included in the quantity of files identified as corresponding to the one or more system files.

16. The apparatus of claim 12, wherein the one or more processors are individually or collectively further operable to execute the code to cause the apparatus to:
determine a first collective byte size corresponding to the subset of the plurality of deleted files identified as corresponding to the one or more system files; and
determine a second collective byte size corresponding to the plurality of deleted files, wherein the first value of the deletion metric comprises the first collective byte size and the second value of the deletion metric comprises the second collective byte size, and wherein the threshold ratio comprises a system file bytes count ratio threshold.

17. The apparatus of claim 16, wherein the one or more processors are individually or collectively further operable to execute the code to cause the apparatus to:
for each file that is identified from among the plurality of deleted files as corresponding to a system file, increment a counter by an amount that is based at least in part on a byte size of the system file, wherein a value of the counter indicates the first collective byte size.

18. The apparatus of claim 16, wherein the one or more processors are individually or collectively further operable to execute the code to cause the apparatus to:
identify one or more temporary files from among the plurality of deleted files, wherein the one or more temporary files are included in the subset of the plurality of deleted files identified as corresponding to the one or more system files.

19. The apparatus of claim 12, wherein, to use the metadata associated with the target computing system to identify the subset of the plurality of deleted files as corresponding to the one or more system files, the one or more processors are individually or collectively further operable to execute the code to cause the apparatus to:
determine a plurality of filepaths, wherein each filepath of the plurality of filepaths corresponds to a respective deleted file of the plurality of deleted files; and
identify the subset of the plurality of deleted files as corresponding to the one or more system files based at least in part on the plurality of filepaths.

20. A non-transitory computer-readable medium storing code, the code comprising instructions executable by one or more processors to:
store, at a control plane of a data management system, a first snapshot captured of a target computing system at a first time;
store, at the control plane of the data management system, a second snapshot of the target computing system at a second time that is later than the first time;
compare the second snapshot with the first snapshot to identify whether a plurality of deleted files, for the target computing system, deleted between the first time and the second time comprises a quantity of deleted files that satisfies a file deletion threshold;
use metadata associated with the target computing system to identify, based at least in part on the quantity of deleted files satisfying the file deletion threshold, a subset of the plurality of deleted files as corresponding to one or more system files;
determine whether a ratio between a first value of a deletion metric for the subset of the plurality of deleted files and a second value of the deletion metric for the plurality of deleted files satisfies a threshold ratio; and transmit an alert based at least in part on the quantity of deleted files satisfying the file deletion threshold and the ratio between the first value of the deletion metric and the second value of the deletion metric failing to satisfy the threshold ratio.

* * * * *